July 7, 1925.
R. H. DAUTERICH
1,545,037
WORK SUPPORT
Filed May 29, 1924
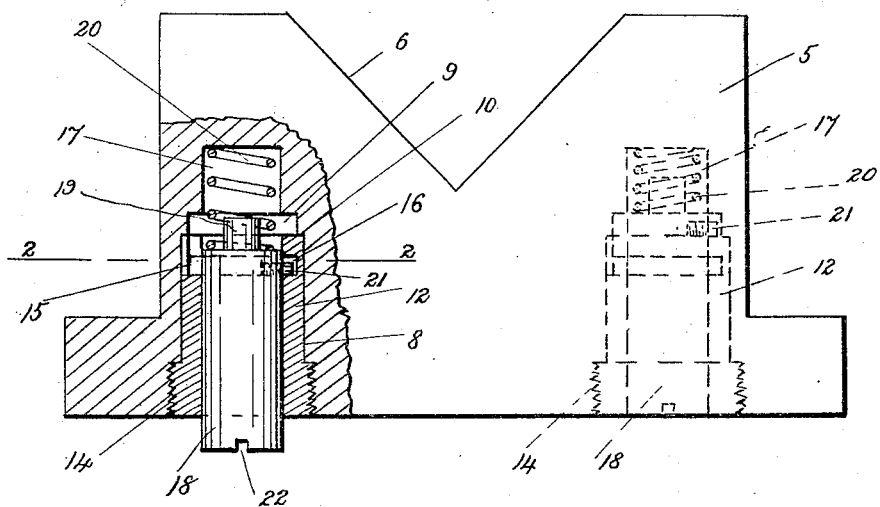
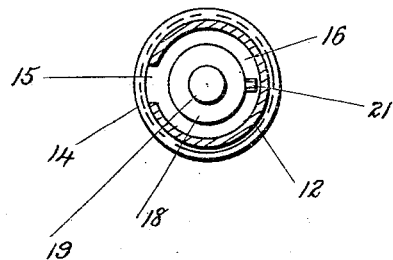
Inventor
Raymond H. Dauterich
by Hubert W. Renner.
Attorney Patented July 7, 1925.

1,545,037

UNITED STATES PATENT OFFICE.

RAYMOND H. DAUTERICH, OF BALTIMORE, MARYLAND.

WORK SUPPORT.

Application filed May 29, 1924. Serial No. 716,771.

*To all whom it may concern:*

Be it known that I, RAYMOND H. DAUTERICH, a citizen of the United States, residing at the city of Baltimore, in the State of Maryland, have invented certain new and useful Improvements in Work Supports, of which the following is a specification.

This invention relates to blocks provided with V-shaped grooves for supporting work on tables and machines in machine shops; and it consists in the novel construction and combination of the parts hereinafter fully described and claimed whereby the block is retained in position on the table.

In the drawings, Figure 1 is an end view of a block constructed according with this invention and partially in section. Fig. 2 is a cross-section through the socket, taken on the line 2—2 in Fig. 1.

In machine shops blocks provided with V-shaped grooves are used to support work, such as cylindrical shafts or pins, on service tables, lathes, milling machines, and other machines. When the machines have slots in their tables the blocks have pins or keys for engaging with the slots and retaining the blocks in position. These pins or keys have to be removed when the tables have no slots, and they are frequently misplaced and lost. According to this invention each block is provided with one or more retractible pins for engaging with the slots. These pins are connected to the blocks, and when not required in use they are pushed in so as to be out of the way.

The supporting block 5 is of any suitable size and shape, and it has a V-shaped groove 6 in its top. When a shaft is supported it is laid in the grooves of two similar blocks. Each block is provided with one or more retractible pins 18. A socket 8 is formed vertically in the block, and it preferably has a recess 9 at its top, which forms a shoulder 10.

A sleeve 12 is inserted in the socket, and it has a screw-threaded portion 14 which secures it in place. The top of the sleeve bears against the shoulder 10, and it has a radial slot 15 formed in it, and an undercut annular groove 16. A spring chamber 17 is also formed in the block at the top of the recess 9. The retaining pin 18 is slidable in the sleeve 12, and it has a projection 19 at its upper end. A helical spring 20 is arranged in the chamber 17 around the projection, and operates to project the pin from the block to a predetermined extent. A small pin 21 is inserted in a hole in one side of the retaining pin near its upper end, and engages with the recess 9 and the groove 16, and is free to slide vertically in the slot 15. The retaining pin has a notch 22 for a screwdriver in its bottom end.

When the block is used on a table provided with a slot, the pin 18 is pushed out by the spring, and is placed in the slot so as to retain the block in place. When the pin is not required, it is retracted and turned around by a screwdriver so that the little pin 21 passes up through the slot 15 and is retained in the recess 9, as shown in dotted lines in Fig. 1.

What I claim is:

1. A grooved work support provided with a vertical socket in its base, a sleeve secured in the said socket and having an internal annular groove and a radial slot in its upper part, and a retaining pin normally slidable vertically and revoluble in the sleeve and having a laterally projecting pin for engaging with the said groove and slot, said pin being projected from the work support and being non-retractible when the said pin is in the said groove and out of line with the radial slot.

2. A grooved work support provided with a vertical socket and a recess at the top of the socket, a sleeve secured in the said socket and having an annular groove and a radial slot at its upper part, and a retaining pin slidable and revoluble in the said sleeve and having a laterally projecting pin which engages with the said recess and groove and is slidable vertically in the radial slot.

3. A grooved work support provided with a vertical socket, a recess at the top of the socket, and a spring chamber above the recess, a sleeve secured in the said socket and having an annular groove and a radial slot in its upper part, a retaining pin slidable and revoluble in the said sleeve and having a laterally projecting pin for engaging with the said recess, groove and slot, and a spring arranged in the spring chamber and operating to project the retaining pin downwardly.

In testimony whereof I have affixed my signature.

RAYMOND H. DAUTERICH.